United States Patent
Farhadi et al.

(10) Patent No.: US 9,282,463 B2
(45) Date of Patent: Mar. 8, 2016

(54) SPECTRUM SHARING IN WHITE SPACE BANDS USING JOINT POWER CONTROL AND CHANNEL ASSIGNMENT

(71) Applicant: Fujitsu Limited, Kawasaki-shi, Kanagawa (JP)

(72) Inventors: Golnaz Farhadi, Sunnyvale, CA (US); Karim Khalil, Columbus, OH (US)

(73) Assignee: Fujitsu Limited, Kawasaki-shi (JP)

( * ) Notice: Subject to any disclaimer, the term of this patent is extended or adjusted under 35 U.S.C. 154(b) by 154 days.

(21) Appl. No.: 14/026,680

(22) Filed: Sep. 13, 2013

(65) Prior Publication Data

US 2015/0078346 A1    Mar. 19, 2015

(51) Int. Cl.
   *H04W 16/14*      (2009.01)
   *H04W 52/04*      (2009.01)
   *H04W 52/24*      (2009.01)
   *H04W 52/36*      (2009.01)

(52) U.S. Cl.
   CPC .............. *H04W 16/14* (2013.01); *H04W 52/04* (2013.01); *H04W 52/244* (2013.01); *H04W 52/367* (2013.01)

(58) Field of Classification Search
   CPC .............. H04W 16/14; H04W 72/082; H04W 72/04–72/0493
   See application file for complete search history.

(56) References Cited

U.S. PATENT DOCUMENTS

| | | | |
|---|---|---|---|
| 2009/0238090 A1 | 9/2009 | Sambhawani et al. | 370/252 |
| 2010/0248739 A1 | 9/2010 | Westerberg et al. | 455/453 |
| 2011/0250916 A1 | 10/2011 | Li et al. | 455/509 |
| 2011/0300891 A1* | 12/2011 | Deb et al. | 455/510 |
| 2011/0310866 A1 | 12/2011 | Kennedy et al. | 370/338 |
| 2012/0230250 A1 | 9/2012 | Kasslin et al. | 370/328 |
| 2014/0128088 A1 | 5/2014 | Farhadi et al. | 455/452.1 |

FOREIGN PATENT DOCUMENTS

WO   WO 2008/088254   7/2008   ........... H04Q 7/36

OTHER PUBLICATIONS

Chicochan et al.; "Channel Assignment Schemes for Infrastructure-based 802.11 WLANs: A Survey"; IEEE Communications Surveys and Tutorials; vol. 12, No. 1; pp. 124-136, 2010.

Beluri et al.; "Mechanisms for lte Coexistance in tv white space"; IEEE Inter. Sypm. Dynamic Spectrum Access Networks; pp. 317-326, 2012.

(Continued)

*Primary Examiner* — Pao Sinkantarakorn

(74) *Attorney, Agent, or Firm* — Baker Botts L.L.P.

(57) ABSTRACT

An optimization framework for spectrum sharing in white space bands formulates an objective function as a linear function of channels and power levels, and constructs a linear set of equations based on a general graph model according to constraints, including spectrum usage regulations and/or resource re-use constraints. The optimization framework provides joint power control and channel assignment where the solution is implemented by an algorithm that allocates time/power/channel to each network to avoid interference while re-using time and/or frequency resources. The solution allocates a fair and orthogonal portion of time on each channel for a certain power level to the networks. The solution can be implemented by a central entity having at least location information of the networks and, upon solving the optimization problem, signals scheduling information of each channel assigned.

12 Claims, 6 Drawing Sheets

(56) References Cited

OTHER PUBLICATIONS

Jankuloska et al.; "Novel Spectrum Sharing Algorithm for Maximizing Supported Wifi-like Secondary Users in TV White Spaces"; European Wireless Conference ; pp. 1-7, 2012.
FCC 10-174; "Second Report and Order and Memorandum Opinion and Order"; pp. 100, 2010.
PCAST Reporting; "Realizing the Full Potential of Government-Held Spectrum of Spur Economic Growth" pp. 192, 2012.
Hastie et al.; "The Elements of Statistical Learning: Data Mining, Inference, and Prediction"; Second Edition; pp. 764, 2009.
Boyd et al.; "Convex Optimization"; Cambridge University Press; pp. 730, 2004.
Bron et al.; "Algorithm 457: Finding All Cliques of an Undirected Graph"; Communications of the ACM, vol. 16, Issue 9; pp. 5, 1973.
Non-Final Office Action, U.S. Appl. No. 13/736,855, 6 pages, May 29, 2014.
Kumar et al., "Spectrum Sharing for Next Generation Wireless Communication Networks", Cognitive Radio and Advanced Spectrum management, First International Workshop on, IEEE, XP031247475, pp. 4, 2008.
IEEE; "P802.19.1/DF3.02, Draft Standard for TV WhiteSpace Coexistence Methods"; pp. 250, 2012.
Mahonen et al., "Automatic Channel Allocation for Small Wireless Local Area Networks Using Graph Colouring Algorithm Approach", IEEE 802.11, pp. 536-539, 2004.
Song et al., "Chapter 2: On the Spectrum Handoff for Cognitive Radio AD Hoc Networks Without Common Control Channel", Cognitive Radio Ad Hoc Networks, p. 37-74, 2011.
Yoon et al., "Voluntary Spectrum Handoff: A Novel Approach to Spectrum Management in CRNs", IEEE ICC 2010 Proceedings, pp. 5, 2010.
Chen et al., "A Relay-Assisted Protocol for Spectrum Mobility and Handover in Cognitive LTE Networks", IEEE Systems Journal, vol. 7, No. 1, pp. 12, 2011.
Zhang, "Spectrum Handoff in Cognitive Radio Networks: Opportunistic and Negotiated Situations", IEEE ICC 2009 Proceedings, pp. 6, 2009.
Lertsinsrubtavee et al., "Spectrum Handoff Strategies for Multiple Channels Cognitive Radio Network", ACM CoNEXT 2010, pp. 2, 2010.
Moscibroda et al., "Load-Aware Spectrum Distribution in Wireless LANs", IEEE 802.11, pp. 10, 2008.
International Search Report and Written Opinion; PCT/US2013/063989; pp. 12, Mar. 17, 2014.
International Search Report and Written Opinion; PCT/US2013/067097; pp. 13, Mar. 24, 2014.
W. Klotz, "Graph Coloring Algorithms", Technical Report Mathematik-Bericht 2002/5 TU Clausthal, 9 pages, 2002.
Vertex Coloring: Welsh-Powell algorithm, [online], Module 2: Planning & Scheduling, 3 pages http://mrsleblancsmath.pbworks.com/w/file/fetch/46119304/vertex%20coloring%20algorithm.pdf, 2013.
D. Brelaz, "New Methods to Color the Vertices of a Graph", Communications of the ACM, vol. 22, No. 4, pp. 251-256, Apr. 1979.
Graph theory lecture note, Part 2, Princeton University, [online], http://web.math.princeton.edu/math_alive/5/Notes2.pdf, 23 pages, 2003.
R. Jain, "The Art of Computer Systems Performance Analysis: Techniques for Experimental Design, Measurement, Simulation, and Modeling", Wiley-Interscience, 1991.
Feng et al., "Enabling Co-channel Coexistence of 802.22 and 801.11af Systems in TV White Spaces", IEEE ICC, 5 pages, 2013.
U.S. Appl. No. 13/736,845, filed Jan. 8, 2013.
Office Action issued in U.S. Appl. No. 13/736,845, 11 pages, May 19, 2014.

\* cited by examiner

SPECTRUM SHARING IN WHITE SPACE BANDS USING JOINT POWER CONTROL AND CHANNEL ASSIGNMENT

BACKGROUND

1. Field of the Disclosure

This disclosure relates generally to communication networks and, in particular, to spectrum sharing in white space bands using joint power control and channel assignment.

2. Description of the Related Art

As the number and types of wireless networks proliferate, and the amount of communication carried thereon increases, it has become increasingly desirable to manage networks comprising wireless networks of differing wireless access technologies, power limitations, frequency limitations, and other differences. Management of such heterogeneous networks may become increasingly complicated because of the shared nature of white space bands. While some solutions have been offered for managing coexistence in white space bands, maximization of spectrum re-use as well as spectrum utilization while avoiding interference remains a challenge.

SUMMARY

In one aspect, a disclosed method for spectrum sharing in white space bands includes receiving network information for N wireless networks operating in a location. The N wireless networks may share M white space band channels. The method may include receiving channel information, including maximum permissible power levels at the location for the M white space band channels, and generating a conflict graph indicating which of the N wireless networks and the M white space band channels interfere for each of L power levels. Based on the conflict graph, the method may include defining linear constraints for the re-use of resources associated with the M white space band channels. The linear constraints may avoid interference among the N wireless networks. The method may also include formulating a linear function for optimizing the resources associated with the M white space band channels.

Additional disclosed aspects for spectrum sharing in white space bands include an article of manufacture comprising a non-transitory, computer-readable medium, and computer executable instructions stored on the computer-readable medium. A further aspect includes a management system for spectrum sharing in white space bands comprising a memory, a processor coupled to the memory, a network interface, and computer executable instructions stored on the memory.

The object and advantages of the embodiments will be realized and achieved at least by the elements, features, and combinations particularly pointed out in the claims.

BRIEF DESCRIPTION OF THE DRAWINGS

For a more complete understanding of the present invention and its advantages, reference is now made to the following description, taken in conjunction with the accompanying drawings, in which.

DESCRIPTION OF PARTICULAR EMBODIMENT(S)

Figure 1:
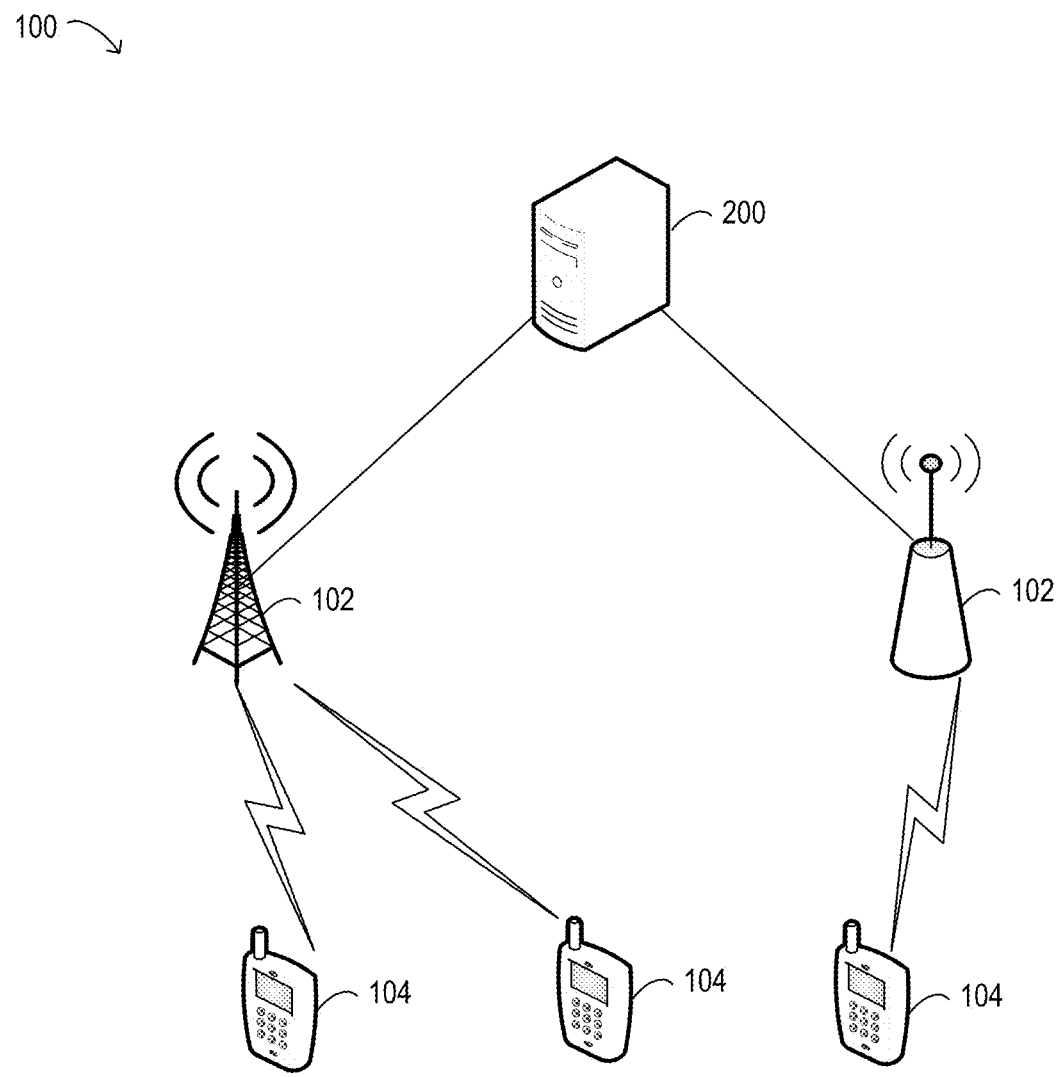
FIG. 1 is a block diagram of selected elements of an embodiment of a network for spectrum sharing in white space bands.

Wireless network providers are demanding more spectra to meet unprecedented growth in mobile data traffic. Despite this fact, the spectrum allocated in many bands (e.g. TV bands or federally allocated bands) may remain heavily underutilized. Regulatory entities around the world have been developing policies to enable access to the unused portions of the band (referred to as "white space bands") when incumbents are not present. At a given location, channels in white space bands may be available for unlicensed access using different power levels, for example, depending on the proximity of incumbents. In order to exploit the additional resource provided by white space bands, multiple networks that share this spectra may be deployed, which may represent a valuable opportunity for wireless network providers. In order to guarantee no interference to the incumbents of the band, the white space band devices/networks may be required to contact a certified database to obtain a list of channels for their location. The channel availability generally varies with the location and the proximity of the primary incumbent user. Thus, at a given location, multiple channels may be available but with different permissible power levels to ensure no interference to nearby incumbent users.

However, without coordination of access to the white space bands, networks located in close proximity of each other may interfere, thus leading high congestion levels and, thus, poor performance. In addition, governed by white space regulations, secondary access may only be permitted with different maximum power levels on the available channels to avoid interference with incumbents. Therefore, it is desirable to have a coexistence mechanism scheme that assigns the channels such that harmful interference is avoided.

Coexistence management schemes for wireless networks sharing unlicensed bands have been examined for Wi-Fi networks (operating in ISM bands). However, the methods proposed for Wi-Fi network sharing may not be readily applicable to heterogeneous coexistence settings in white space bands. For example, Wi-Fi networks typically listen to beacon frames transmitted from their neighbor networks and choose the channel with less congestion. However, the heterogonous coexistence with other wireless technologies may make the neighbor discovery difficult and/or impractical, and may further incur a large overhead that may adversely affect users and network infrastructure.

Recently, a coexistence gap method was proposed when long-term evolution (LTE) networks coexist with Wi-Fi networks (based on IEEE 802.11 technology). Based on this method, LTE networks stop their transmissions for some portion of the time to allow other networks to transmit over substantially the same band. Also, cooperation-based algorithms have been developed to select transmission power and channel at each of the coexisting networks, assuming that users in common communication range will relay messages needed for coordination. In addition, IEEE 802.19.1 has developed an architecture that enables coordinated management. Other algorithms that enable orthogonal channel assignment have been proposed (including U.S. patent application Ser. No. 13/736,845 filed on Jan. 8, 2013). However, such algorithms and methods may not utilize additional power levels that become available for some channels in the white space bands, leading to poor spectral utilization.

As will be described in further detail herein, an optimization framework for spectrum sharing in white space bands allocates orthogonal channels to each network while utilizing available power levels as long as interference is avoided. The methods and algorithms described herein may accordingly achieve significant throughput performance enhancements for spectrum sharing in white space bands. In contrast with the scheme developed in U.S. patent application Ser. No. 13/736,845 (assuming no power control), the present disclosure presents an optimization framework for joint power control and channel assignment to efficiently coordinate access from co-located networks aiming at achieving fairness across the networks while increasing resource utilization. The methods disclosed herein may be implemented by a central entity (e.g. a white space band database manager) having the knowledge of location information and, optionally, other information such as network access technology and/or actual network load conditions.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Particular embodiments and their advantages are best understood by reference to FIGS. 1 through 6C, wherein like numbers are used to indicate like and corresponding parts.

Turning now to the drawings, FIG. 1 is a block diagram showing selected elements of an embodiment of network 100 for spectrum sharing in white space bands, in accordance with certain embodiments of the present disclosure. In some embodiments, network 100 may include wireless networks 102, user equipment 104, and management system 200 communicatively coupled to wireless networks 102. As shown in FIG. 1, management system 200 may be in fixed communication with wireless networks 102 using galvanic and/or optical media (not shown), for example. Wireless networks 102 may, in turn, provide wireless signals for enabling network access by user equipment 104 to allow communication by user equipment 104 across wireless networks 102. As will be described herein, management system 200 may be configured to manage resources (e.g., channel assignments and/or power levels) and to act as a spectrum broker for spectrum sharing in white space bands.

In some embodiments, wireless network 102 may be an access point to a communication network, the access point configured to allow user equipment 102 to communicate over the communication network. In some embodiments, each wireless network 102 shares the same spectrum band as other wireless networks 102, while potentially operating on a different wireless access technology (e.g., IEEE 802.11, IEEE 802.22, LTE, etc.). Further, each wireless network 102 may be owned and/or operated by a different operator. For example, system 100 may include four wireless networks 102, including two LTE transmission towers, and two 802.22 wireless access points. In the same or alternative configurations, system 100 may include, more, fewer, or different configurations of wireless networks 102 without departing from the scope of the present disclosure.

In some embodiments, user equipment 104 may be an electronic device and/or combination of electronic devices configured to communicate and/or facilitate communication over any or all of the wireless networks 102. For example, user equipment 104 may be a cellular telephone, tablet computer, laptop computer, network of other user equipment 104, and/or other appropriate electronic device may be configured to transmit and/or receive data over wireless network 102.

In operation of network 100, white space bands may provide additional resources for wireless networks 102 to meet the increasing demand for mobile data traffic. Because of the scarcity of the spectrum and growing interest in offloading data traffic over white space bands, management system 200 may be enabled to control interference among neighbor networks and to increase resource (i.e., channel and/or power) utilization. White space bands may provide additional spectra with different power levels (e.g., in the TV band) for some channels depending on the activity of incumbents. In order to reuse spectrum and to better utilize additional power levels on some channels, orthogonal channel assignment may be provided along with power control, and may be subject to constraints from spectrum usage regulations. The network topology and interference relations may be represented by an interference graph G where the network nodes are the networks and edges between a pair of network nodes denote interference between the pair of network nodes. For example, two networks may be declared interfering when they are located in the interference range of each other. The interference range may depend on the access technology (e.g., LTE networks have larger coverage than Wi-Fi networks). When only location information is known, the central entity, such as management system 200, may assume the largest interference range and accordingly construct a more conservative interference graph.

One objective for spectrum sharing in white space bands is to develop a framework that efficiently allocates channels and adjusts the power levels while complying with spectrum usage regulations in the white space bands. Specifically, certain spectrum usage regulations for the TV band, depending on location and regulatory authority, may mandate, for example, that for fixed TV band devices (e.g., macro base stations), a maximum power delivered to a transmitting antenna shall not exceed a certain power level (e.g., 1 W) regardless of a number of TV channels on which the fixed TV band device operates. Other spectrum usage regulations may mandate that for personal/portable TV band devices (e.g., access points, low power small cells, and/or mobile devices), a maximum transmit power shall not exceed a certain power level (e.g., 100 mW or 20 dBm). Still other spectrum usage regulations may mandate that personal/portable TV band devices that do not meet declared adjacent channel separation requirements may be limited to a certain maximum transmit power (e.g., 40 mW or 16 dBm). In some areas, the maximum power levels may apply regardless of the number of TV channels on which the device operates. Further spectrum usage regulations may specify that a power spectral density conducted from certain TV band devices (e.g., fixed devices, personal/portable/mobile devices operating adjacent to occupied TV channels, sensing devices, other personal/portable devices, among other examples) to the antenna shall not be greater than given values when measured in a defined band (e.g., any 100 kHz band) during any time interval of continuous transmission.

In particular, certain spectrum usage regulations may indicate that aggregation of multiple channels with different power levels is not permitted. Therefore, when channels with different power levels are allocated to a network, the operation over these channels may be separated (e.g., in the time domain), or the transmit power for operation on all channels at substantially the same time is desired to be limited to the lowest permissible power level permissible for all channels.

The optimization problem for spectrum sharing in white space bands may be expressed in terms of a network utility function $U_n$ and may be generally formulated by the following objective.

$$\max \min_n U_n \quad \text{Formula [1]}$$

This objective may be subject to re-use constraints, power constraints, and regulatory constraints (as discussed above). The objective is to maximize a network utility function such that resource utilization is increased (i.e., both spectrum re-use and using additional power levels permissible for some channels). Increasing resource utilization may involve a trade-off between more re-use and more power possibilities. Transmitting at lower power level may lead to a sparser interference graph and, thus, more chances of re-use. On the other hand, transmitting with higher power level may achieve higher data rates, but since the interference power is also larger, the opportunities for spectrum re-use may be reduced.

The utility function may represent a measure of performance corresponding to each network n. In general, the utility function may be a non-linear non-convex function of the channels assigned (or bandwidth) and power, such that solving the optimization problem in Formula [1] may be computationally intractable even with a linear set of constraints.

One primary goal of spectrum sharing in white space bands is to achieve fair performance (e.g., in terms of achievable throughput) through coordinated channel assignment and power control. In particular, the following properties may be observed according to the achievable throughput:

P1. Increasing the allocated bandwidth improves the data rate.

P2. Noise power also increases with larger bandwidth. Since spectrum usage regulations may mandate substantially the same power level regardless of the number of channels used, increasing bandwidth leads to smaller signal-to-noise ratio (SNR), when more than one channel is employed.

P3. With larger transmit power levels, the achievable throughput is larger (assuming no interference).

P4. Given (P2), the impact of having a larger transmit power may overweigh the impact of having a larger bandwidth.

The inventors of the present disclosure have observed that the achievable throughput may be approximated by a piece-wise linear function of the bandwidth for each power level. For example, two successive linear curves may be fitted to an actual data rate versus bandwidth functions (obtained assuming time sharing) for different power levels. With time sharing, employed, the utility of each network may be the sum of the utilities achieved over all allocated channels per power level. In such cases, the objective function may be written in the form given by Formula [2].

$$\max_C \min_n U_n = \begin{bmatrix} \sum_{l=1}^{L} a_{t(n)}^l w_s \sum_{m=1}^{M} c_{lmn}; & \text{if} \sum_{m=1}^{L} c_{lmn} \le 1 \\ \sum_{l=1}^{L} b_{t(n)}^l w_s \sum_{m=1}^{M} c_{lmn} + d_{t(n)}^l; & o.w. \end{bmatrix} \quad \text{Formula [2]}$$

In Formula [2], l denotes the power level, m denotes the channel, n denotes the network, $w_s$ denotes the channel bandwidth (also simply referred to as w), and $a_{t(n)}^l$, $b_{t(n)}^l$, and $d_{t(n)}^l$ denote the parameters of the piece-wise linear model fitted to the actual throughput curve for each power level, c is a fraction of time a resource (e.g., channel and/or power level) is allocated to a network, C (under the max) denotes the vector of c_{lmn}, and t(n) represents a technology of network n (throughput may depend on technology, e.g., WiFi, LTE, etc.). These constants may depend on the access technology and the maximum transmit power level and may be obtained using least-squares normal equations. Since certain spectrum usage regulations may limit both the power spectral density (PSD) and the maximum transmission power, SNR values may differ when time sharing is employed over single and/or multiple channels. When a single channel is employed, the SNR may be constant irrespective of any amount of bandwidth used. When more than one channel is employed, however, SNR may decrease with the number of channels. This variation in the behavior of SNR with bandwidth $w_s$ (in MHz) is employed and captured in the throughput model by using two linear curves. In both curves, the slope of the linear curve may be dependent on the technology and power level used.

It is noted that assigning a fair share of each channel with different available power levels may involve time sharing, as will be described in further detail herein. Within one power level, more than one channel may be assigned, if applicable, to increase spectrum utilization. However, the achievable throughout may depend on the bandwidth over which time sharing is performed. Since the power is fixed regardless of the number of channels, the throughput gain may diminish when aggregating larger numbers of channels. The utility function representing the throughput per power level may involve non-convex (in terms of l0-norm) functions to denote the corresponding number of aggregated channels, which may make the optimization problem computationally intractable.

Therefore, the methods disclosed herein apply time sharing across both power levels and channels (i.e., no aggregation) to formulate a computationally tractable objective function. Since a fraction (or percentage) of time over each channel per power level is assigned to a network, time sharing for each channel is over one white space channel. Consequently, the maximum bandwidth allocated to a network is one full white space channel. Thus, the throughput per power level may be approximated by a simple linear function of bandwidth, resulting in an objective function given by Formula [3].

$$\max_C \min_n U_n = \sum_{l=1}^{L} a_{t(n)}^l w_s \sum_{m=1}^{M} c_{lmn} \quad \text{Formula [3]}$$

As disclosed herein, an algorithm for time sharing may be employed to achieve orthogonal operation of channels with different power levels. The time sharing may be performed over the entire white space channel to meet certain regulatory conditions, as noted previously. In certain cases where a number of available channels is constrained to a few channels, orthogonal sharing in the time domain may be solved using a linear algorithm given by Formula [3] that may be efficiently solved.

Figure 2:
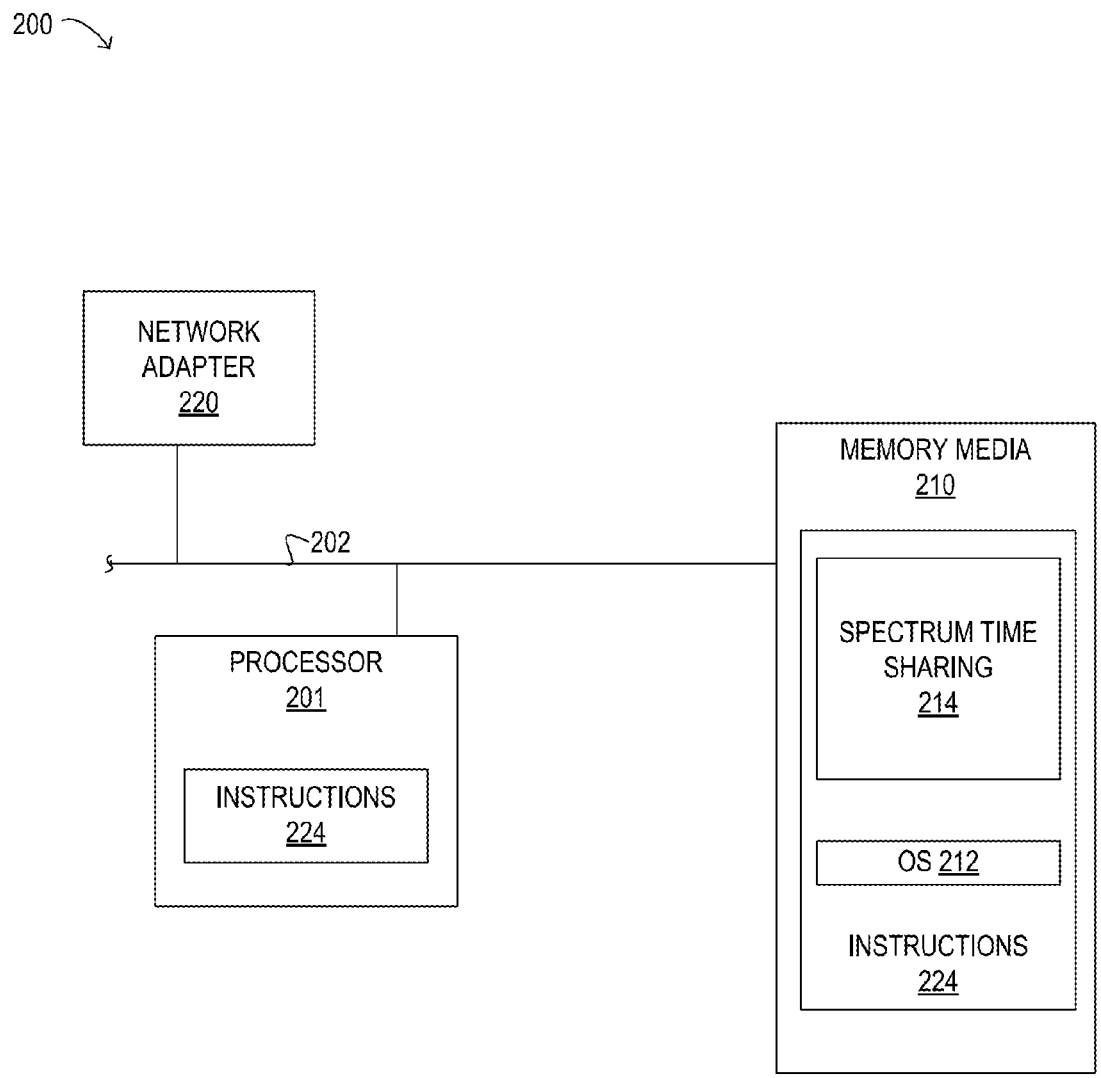
FIG. 2 is a block diagram of selected elements of an embodiment of a management system for spectrum sharing in white space bands.

Referring now to FIG. 2, a block diagram illustrates selected elements of an embodiment of management system 200 for spectrum sharing in white space bands according to the present disclosure. In the embodiment depicted in FIG. 2, management system 200 includes processor 201 coupled via shared bus 202 to storage media collectively identified as memory media 210. Management system 200, as depicted in FIG. 2, further includes network adapter 220 that interfaces management system 200 to a network, such as portions of network 100, including wireless networks 102 (see FIG. 1).

In FIG. 2, memory media 210 may comprise persistent and volatile media, fixed and removable media, and magnetic and semiconductor media. Memory media 210 is operable to store instructions, data, or both. Memory media 210 as shown includes sets or sequences of instructions 224, namely, an operating system 212 and spectrum time sharing 214. Operating system 212 may be a UNIX or UNIX-like operating system, a Windows® family operating system, or another suitable operating system. Instructions 224 may also reside, completely or at least partially, within processor 201 during execution thereof. It is further noted that processor 201 may be configured to receive instructions 224 from memory media 210 via shared bus 202. As described herein, spectrum time sharing 214 may represent instructions and/or code for implementing various algorithms according to the present disclosure.

Figure 3:
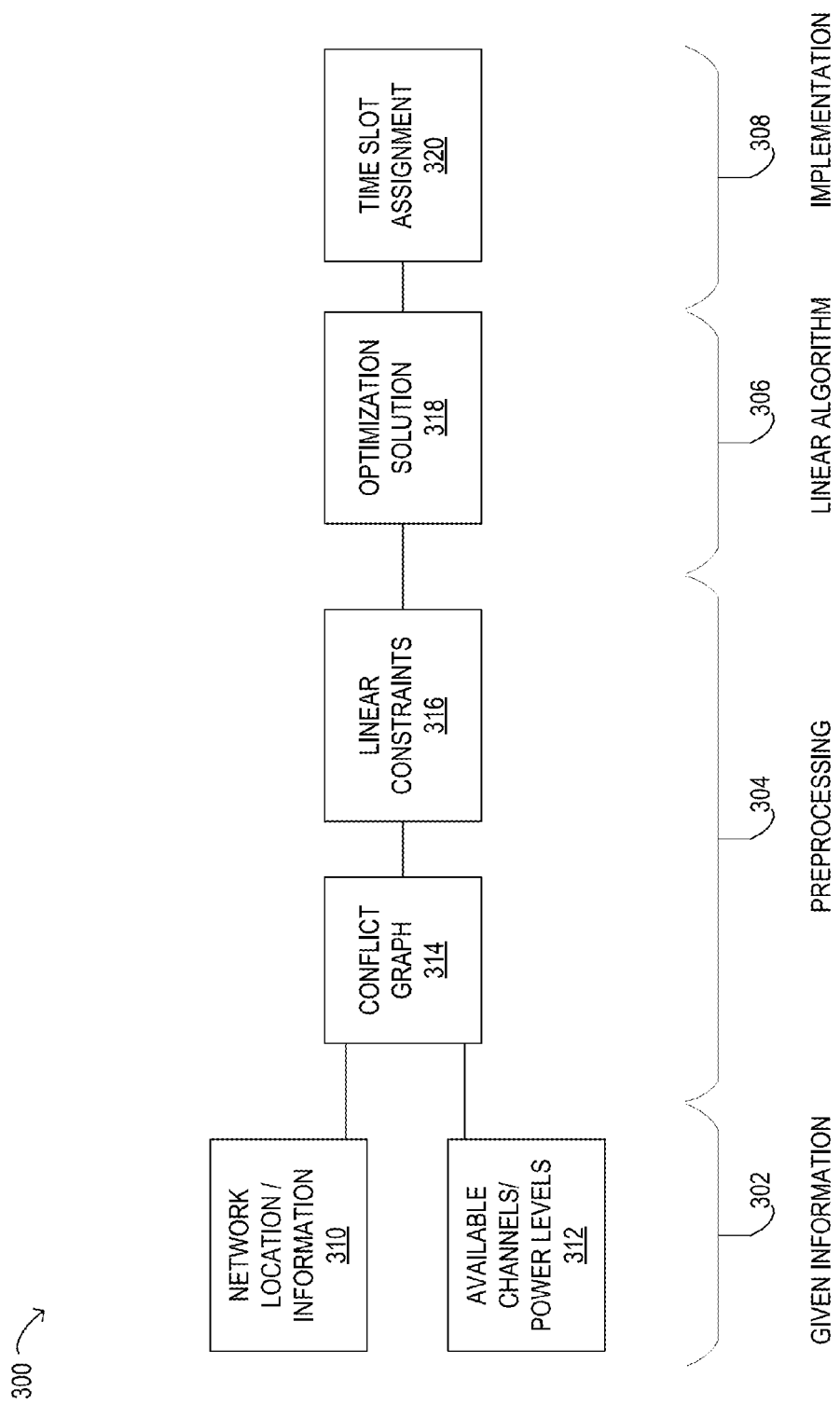
FIG. 3 is a block diagram of selected elements of an embodiment of an optimization framework for spectrum sharing in white space bands.

Turning now to FIG. 3, selected elements of an embodiment of optimization framework 300 are shown in diagram form. Optimization framework 300 may represent data and/or operations performed, for example, by spectrum time sharing 214 (see FIG. 2) when implementing an algorithm for spectrum sharing in white space bands, as described herein. In optimization formwork 300, a conflict graph is first constructed, which is used to formulate the set of constraints ensuring orthogonal operation over white space bands with different power levels. Given the information about networks locations and available white space channels, a conflict graph may be constructed with each node representing a time resource assigned for a given network on a given white space channel with some transmission power level. The conflict graph is then mapped to a set of linear constraints. Next, using a linear utility function for each network, a linear program (LP) that assigns the resources fairly across different networks is solved. Finally, an algorithm that assigns actual resources to different networks in order to meet the solution of the linear program is implemented.

In optimization framework 300, as shown in FIG. 3, given information 302 may represent inputs to the algorithm, including network location/information 310 and available channels/power levels 312. Network location/information 310 may represent location information and/or other information (e.g., network load, network access technology, etc.) for the wireless networks for which spectrum sharing is to be brokered. Available channels/power levels 312 may represent regulatory and/or geographic information about white space band channels available in a location given by network location/information 310.

In FIG. 3, conflict graph 314 and linear constraints 316 may represent preprocessing 304 that is performed prior to solving the LP. In conflict graph 314 (also denoted by $G_c$), there are LMN conflict nodes where each conflict node represents an allocation $c_{lmn}$, for some network n, channel m and power level l. An edge between two conflict nodes represents a conflict (i.e., between $c_{lmn}$ and $c_{l'm'n'}$) and indicates that that networks n and n' may not respectively be assigned channels m and m' with respective power levels l and l'. In other words, channels m and m' are not orthogonal with respect to networks n and n' and/or power levels l and l'. For a given network, spectrum usage regulations may not allow transmission with two different power levels over different channels at substantially the same time. Therefore, in various embodiments of conflict graph 314, an edge may be introduced between conflict nodes $c_{lmn}$ and $c_{l'm'n'}$ to force time sharing between different channels with different power levels. In addition, to allow for the polynomial time complexity linear problems, a scenario where a network cannot aggregate channels (cannot transmit on more than one channel at a given time) is assumed. This model is relevant when the number of white space channels available is limited at a given location and, thus, no possibility of aggregation exists, and may be implemented in the conflict graph by adding an edge between conflict nodes $c_{lmn}$ and $C_{l'm'n'}$. Thus, conflict nodes representing one network (for different power levels and channels) may form a complete sub-conflict graph of conflict graph $G_c$ (see also FIG. 4, section (a)). A given pair of networks with fixed locations may interfere on a given channel at a certain power level, yet may not interfere at another power level. This behavior may be used to connect different conflict nodes representing different networks in the construction of conflict graph 314 (see also FIG. 4, section (b)). Furthermore, in the interest of attaining a feasible allocation of resources (e.g., time slots and/or bandwidth), for pairs of networks interfering at some power levels, additional edges between conflict nodes associated with these networks corresponding to different channels and interfering power levels may be introduced (see also FIG. 4, section (c)).

After construction of conflict graph 314, linear constraints 316 may be formulated using either of the following procedures, Procedure 1 or Procedure 2.

Procedure 1: Constructing neighbor reuse sets and pairwise constraints:

$$c+\Sigma_{c'\in N_1(c)}c'\le 1\forall c\in g_c$$

$$c+c'\le 1\forall c,c'\in g_c, c\ne c', E_{cc'}=1$$

where $E_{cc'}=1$ implies an edge between conflict nodes c and c'. Here, an algorithm, which constructs the set $N_1(c)$ for every node c in the conflict graph $G_c$, is used. In this set, a subset of the neighbors of a network c is chosen (and thus are considered in the constraint above) such that the complete set of constraints for all networks ensures orthogonal resource allocation for all conflict nodes in the conflict graph while maximizing the utilization of the resource.

Procedure 2: Construct the set of linear constraints by finding all cliques in the conflict graph. Each clique (c, c',c", . . . ) is mapped to the constraint c+c'+c"+ . . . ≤1.

Then, in FIG. 3, solving linear algorithm 306 (see Formula [3]) results in optimization solution 318, which yields $c_{lmn}$ representing the percentage of time channel m with power level l allocated to network n.

Finally, in FIG. 3, time slot assignment 320 represents implementation 308, where time/power/spectrum resources are allocated to the networks according to optimization solution 318, such that interference is avoided, while both time and frequency resources are re-used. First, a duration of one time slot is defined as t=1/K, where K is the number of time slots per unit time. Thus, the number of time slots required to satisfy optimization solution 318 is $s_{lmn}$=floor($c_{lmn}$/t). Let S be the set of all available K time slots. For every pair of networks (u,v), $l^*_{uv}$ is defined as the minimum power level employed by one network so that (u,v) are adjacent in conflict graph $G_c$ (i.e., conflict nodes representing u,v are connected in $G_e$). Let $S_{lmn}$, $S_{lmn}^a$ be the respective sets of available and allocated time slots that may be allocated for network n over channel m using power level l. The set $S_{lmn}$ contains all the time slots not allocated to neighbors of network n in $G_c$ at any power level l'<l. Then, some values for l, m, n may be fixed. A network u is defined as a reuse network for network n on channel m when n, u employ power level l, if $l^*_{nu}$>l. The set containing all such networks u is denoted as R(l, m, n).

Finally, the set of reuse time slots for a network n on channel m and power level l is defined in Formula [4]. With these definitions, a simple greedy resource assignment algorithm may be implemented (see FIG. 5).

$$S^r_{lmn} = \bigcup_{u \in R(l,m,n), l < l^a_{nu}} S^a_{lmu} \bigcup_{l,m' \neq m, u \neq n} S^a_{lm'u}$$ Formula [4]

Figure 4:
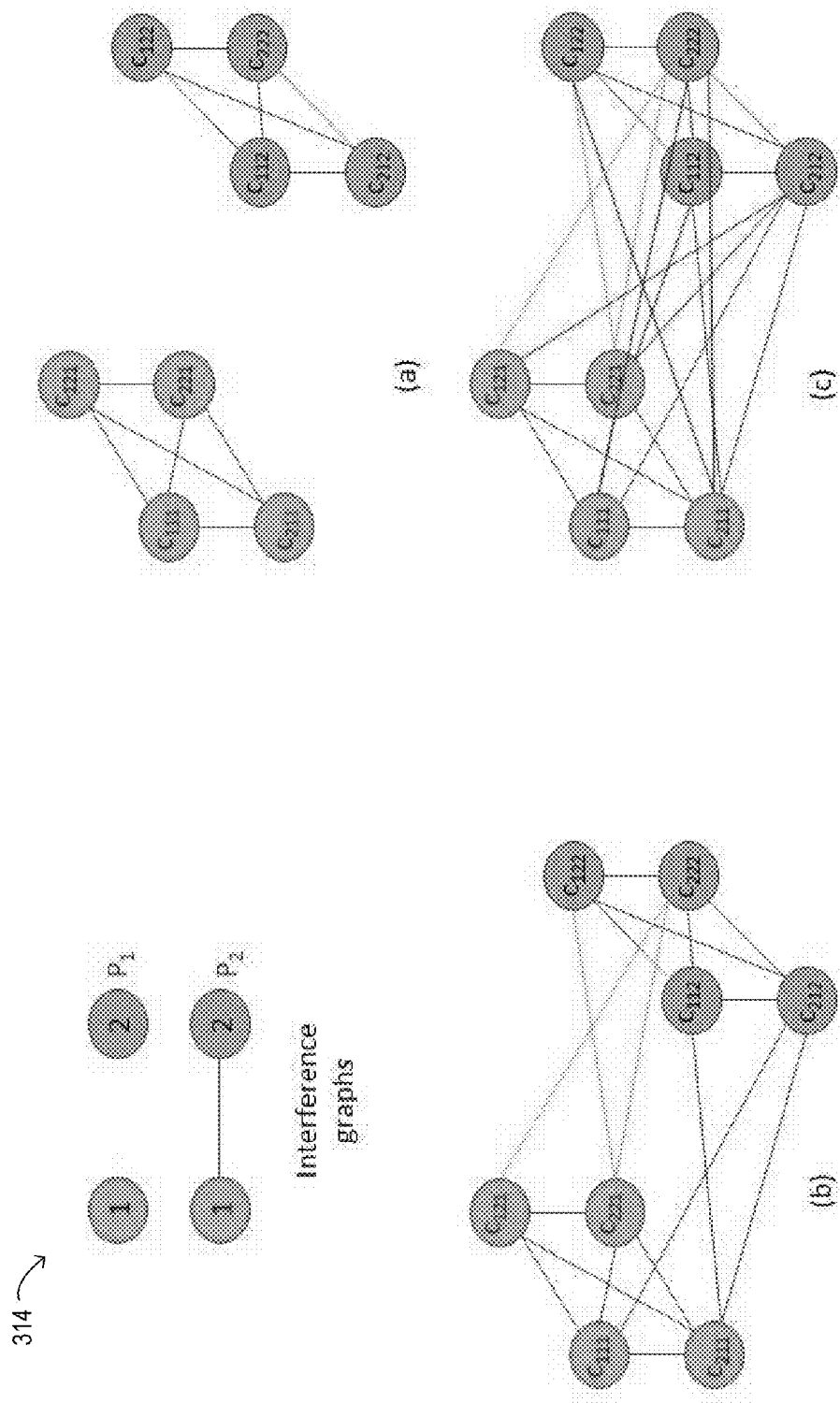
FIG. 4 is a block diagram of selected elements of an embodiment of a conflict graph.

Turning now to FIG. 4, selected elements on an embodiment of conflict graph 314 are shown in further detail. In FIG. 4, conflict graph 314 is constructed for two networks, two channels and two power levels. The networks 1, 2 interfere when higher power level $P_2$ is employed, and do not interfere when lower power level $P_1$ is employed, as shown in the interference graphs section (a) of FIG. 4. In FIG. 4, section (a) depicts two conflict graphs indicating that all the conflict nodes representing $C_{lmn}$ for each network n are connected for each respective power level l. Then, in FIG. 4, section (b), $C_{lmn}$ conflict nodes representing each channel m are connected between both networks n in the depicted conflict graphs. It is noted that since networks 1 and 2 do not interfere when both employ power level $P_1$, as given by the interference graph, then $c_{111}$ is not connected to $C_{112}$ and $C_{121}$ is not connected to $C_{122}$ in the conflict graph. Finally, in FIG. 4, section (c), to guarantee feasible allocation of the resources (e.g., time and/or bandwidth), for pairs of networks n interfering at some power level l in the interference graph, edges are introduced between conflict nodes representing different channels in the conflict graph. For example, in FIG. 4, section (c), the corresponding conflict graph depicts that $C_{211}$ is connected to both $C_{122}$ and $C_{222}$.

Figure 5:
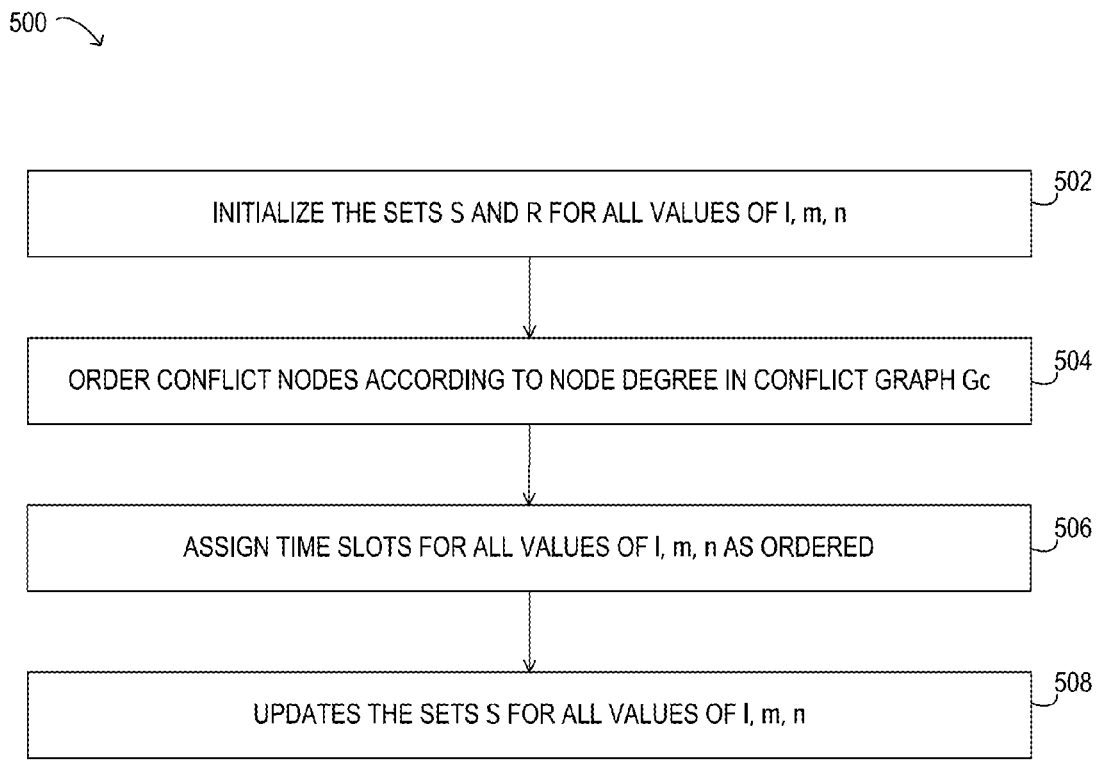
FIG. 5 is a flow chart of selected elements of an embodiment of a method for resource assignment for spectrum sharing in white space bands.

Turning now to FIG. 5, selected elements on an embodiment of method 500 are shown in flow chart format. Method 500 may represent a simple greedy resource assignment algorithm according to the definitions presented above with respect to implementation 308 in FIG. 3. It is noted that certain operations depicted in method 500 may be rearranged or omitted, as desired.

Method 500 may begin by initializing (operation 502) the sets S and R for all values of l, m, n. Specifically, sets S, $S_{lmn}$, $S_{lmn}{}^a$, R(l, m, n), $S_{lmn}{}^r$, may be initialized in operation 502 for all l,m,n. Formula [4] may be used for the initialization in operation 502. Then, conflict nodes may be ordered (operation 504) according to node degree in conflict graph $G_c$. Time slots may me assigned (operation 506) for all values of l, m, n as ordered. In operation 506, the following pseudo-code procedure may be implemented to assign the time slots:

Let $C_{ordered}$ denote the array of size LMN containing the ordered conflict nodes $c_{lmn}$ in the conflict graph.
// assign the time slots for each element in $C_{ordered}$ as follows
for k = 1: LMN
// for the kth element in $C_{ordered}$, which corresponds to a power level l, channel m, network n
   for s= 1: $S_{lmn}$
      assign time slots from $S_{lmn} \cap S_{lmn}{}^r$
      if not enough slots, assign remaining from $S_{lmn}$
   end for
end for Then, the sets S may be updated (operation 508) all values of l, m, n. Specifically, sets $S_{lmn}$, $S_{lmn}{}^a$, $S_{lmn}{}^r$ may be updated in operation 506 for all l,m,n.

Figure 6A:
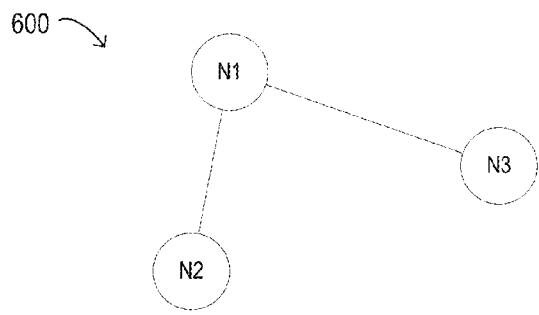
FIGS. 6A, 6B, and 6C are selected elements of an embodiment of an interference graph.
Figure 6B:
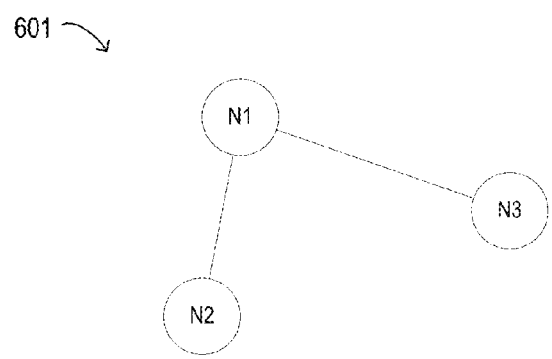
Figure 6C:
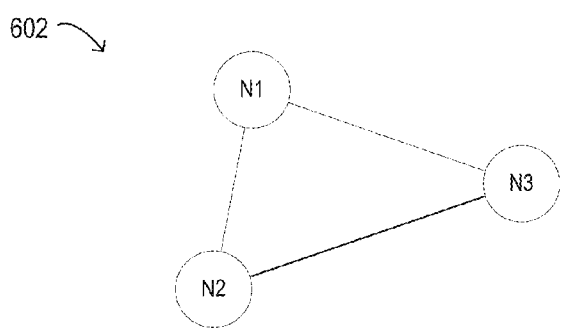

Turning now to FIGS. 6A-6C, a topology of an example of an algorithm for spectrum sharing in white space bands, as described herein is illustrated for an area where N networks share M white space channels for L permissible maximum power levels. FIGS. 6A, 6B, and 6C illustrate interference graphs 600, 601, and 602, where N=3 {N1, N2, N3}, M=2 {c1, c2}, and L=3 {40 mW, 70 mW, 100 mW}. In FIGS. 6A, 6B, and 6C, respective interference graphs 600, 601, and 602 may each represent a network topology at a different power level (e.g., 40 mW, 70 mW, and 100 mW). In interference graphs 600, 601, and 602, the network nodes (circles) represent different networks and edges (lines) between network nodes are present when two networks interfere with one another. It will be understood that, in different embodiments, interference graphs, as described herein, may have different numbers of network nodes and edges.

In interference graph 600 of FIG. 6A and interference graph 601 in FIG. 6B, network node N1 may interfere with network nodes N2 and N3. In interference graph 602 of FIG. 6C, network node N2 may additional interfere with network node N3. As shown in FIGS. 6A-6C, the power level increases from a first power level (i.e., P1=40 mW) for interference graph 600 to a second power level (i.e., P2=70 mW) for interference graph 601 to a third power level (i.e., 100 mW) for interference graph 602.

In the network topology shown in FIGS. 6A-6C, network nodes N1 and N2 may represent LTE networks, while network node N3 may represent a Wi-Fi network that coexist in a simulation area. It is further assumed that the two channels (c1, c2) have maximum transmit power 40 mW and 100 mW, respectively. Thus, channel c2 may operate on any power level up to 100 mW. FIGS. 6A-6C show the interference graphs corresponding to three power levels (40 mW, 70 mW, 100 mW), while the joint power control and channel assignment solution (by solving the proposed LP) along with the time sharing implementation according to method 500 is shown in Table 1 below. For the objective function in LP, it may be assumed that a central server solving the problem (i.e., management system 200, see FIGS. 1 and 2) generates values for the throughput for different access technologies and power levels assuming a certain number of users (e.g., according to the network load information, when available, or any number of users otherwise) in their communication range. A linear function may then be fitted to these values for each power level and access technology. For this example, it may be assumed that the access technology information of the coexisting networks is not available at the central server. Therefore, the average of the slope values for different technologies for the slope of the utility function may be adopted for each power level. It is seen from Table 1 that each network gets substantially an equal share of the channel with larger power level shared in time. This is because without knowledge of the access technology, each network is assumed to have substantially the same utility function.

TABLE 1

An example of a joint power and channel assignment solution.

| Network | Power Level | c1 Time Slot | c2 Time Slot |
|---------|-------------|--------------|--------------|
| 1 | P1 | 50% | 0 |
| 1 | P2 | 0 | 50% |
| 1 | P3 | 0 | 0 |
| 2 | P1 | 50% | 0 |
| 2 | P2 | 0 | 50% |
| 2 | P3 | 0 | 0 |
| 3 | P1 | 50% | 0 |
| 3 | P2 | 0 | 50% |
| 3 | P3 | 0 | 0 |

For this example, the achievable throughput of an algorithm according to the methods described herein for spectrum sharing in white space bands may be evaluated, as well as an algorithm with no power control and a baseline policy. In the algorithm with no power control, the transmit power per channel is limited to 40 mW, such that network 1 gets channel c1 and networks 2 and 3 get channel c2. In the baseline channel selection policy, a Wi-Fi network simply chooses a channel with the least congestion and an LTE network picks the channel with the smallest interference level. For a selected channel, a network transmits with the maximum power level allowed. The algorithm according to the methods described herein for spectrum sharing in white space bands, which employs power control utilizing larger transmit power permissible for some channels along with coordinated channel access, may achieve a throughput gain of about 45% compared to the baseline and a gain of about 23% compared to the no power control policy for the worst performing network.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for spectrum sharing in white space bands, comprising:
    receiving, by a processor, network information for N wireless networks operating in a location, wherein the N wireless networks share M white space band channels, wherein N and M are integers greater than or equal to 1;
    receiving channel information, including maximum permissible power levels at the location for the M white space band channels;
    generating a conflict graph indicating which of the N wireless networks and the M white space band channels interfere for each of L power levels, wherein L is an integer greater than or equal to 1;
    based on the conflict graph, defining linear constraints for the re-use of resources associated with the M white space band channels, wherein the linear constraints avoid interference among the N wireless networks;
    formulating a linear function for optimizing the resources associated with the M white space band channels;
    solving the linear function to obtain an allocation of the resources associated with the M white space band channels, the resources including time slots and power levels assigned to each of the N wireless networks; and
    implementing the allocation by assigning the resources, including time slots and power levels, for each of the M white space band channels to each of the N wireless networks.

2. The method of claim 1, wherein assigning the resources includes signaling scheduling information to a respective wireless network for each of the M white space band channels.

3. The method of claim 1, wherein the linear constraints comply with spectrum usage regulations on the use of the M white space band channels.

4. The method of claim 1, wherein the linear constraints maximize allocation of the resources associated with the M white space band channels.

5. The method of claim 1, wherein the network information includes a type of wireless access technology.

6. The method of claim 1, wherein the conflict graph includes:
    conflict nodes representing a white space band channel at a given power level for a given wireless network; and
    edges between selected pairs of the conflict nodes, the edges representing a conflict between a pair of conflict nodes, and wherein generating the conflict graph includes at least one of:
    adding a first edge between a first pair of conflict nodes commonly associated with a first wireless network, a first pair of different white space band channels, and a first pair of different power levels to force time sharing of the first pair of different white space band channels to comply with spectrum usage regulations;
    adding a second edge between a second pair of conflict nodes commonly associated with a second wireless network, a first power level and a second pair of different white space band channels to force time sharing of the second pair of different white space band channels; and
    adding a third edge between a third pair of conflict nodes commonly associated with a first pair of different wireless networks interfering for at least one power level, a third pair of different white space band channels and a second power level;
    adding a fourth edge between a fourth pair of conflict nodes commonly associated with a second pair of different wireless networks interfering for at least one power level, a fourth pair of different white space band channels and a second pair of different power levels;
    adding a fifth edge between a fifth pair of conflict nodes commonly associated with a third pair of different wireless networks, a first white space channel, and a third power level; and
    adding a sixth edge between a sixth pair of conflict nodes commonly associated with a fourth pair of wireless networks, a second white space channel, and a third pair of different power levels.

7. An article of manufacture comprising:
a non-transitory, computer-readable medium; and
computer executable instructions stored on the computer-readable medium, the instructions readable by a processor and, when executed, for causing the processor to:
receive network information for N wireless networks operating in a location, wherein the N wireless networks share M white space band channels, wherein N and M are integers greater than or equal to 1;
receive channel information, including maximum permissible power levels at the location for the M white space band channels;
generate a conflict graph indicating which of the N wireless networks and the M white space band channels interfere for each of L power levels, wherein L is an integer greater than or equal to 1;
based on the conflict graph, define linear constraints for the re-use of resources associated with the M white space band channels, wherein the linear constraints avoid interference among the N wireless networks;
formulate a linear function for optimizing the resources associated with the M white space band channels;
solve the linear function to obtain an allocation of the resources associated with the M white space band channels, the resources including time slots and power levels assigned to each of the N wireless networks; and implement the allocation by assigning the resources, including time slots and power levels, for each of the M white space band channels to each of the N wireless networks.

8. The article of manufacture of claim 7, wherein the instructions to assign the resources include instructions to signal scheduling information to a respective wireless network for each of the M white space band channels.

9. The article of manufacture of claim 7, wherein the linear constraints comply with spectrum usage regulations on the use of the M white space band channels.

10. The article of manufacture of claim 7, wherein the linear constraints maximize allocation of the resources associated with the M white space band channels.

11. The article of manufacture of claim 7, wherein the network information includes a type of wireless access technology.

12. The article of manufacture of claim 7, wherein the conflict graph includes:

conflict nodes representing a white space band channel at a given power level for a given wireless network; and edges between selected pairs of the conflict nodes, the edges representing a conflict between a pair of conflict nodes, and wherein the instructions to generate the conflict graph include instructions to execute at least one of:

add a first edge between a first pair of conflict nodes commonly associated with a first wireless network, a first pair of different white space band channels, and a first pair of different power levels to force time sharing of the first pair of different white space band channels to comply with spectrum usage regulations;

add a second edge between a second pair of conflict nodes commonly associated with a second wireless network, a first power level and a second pair of different white space band channels to force time sharing of the second pair of different white space band channels;

and add a third edge between a third pair of conflict nodes commonly associated with a first pair of different wireless networks interfering for at least one power level, a third pair of different white space band channels and a second power level;

add a fourth edge between a fourth pair of conflict nodes commonly associated with a second pair of different wireless networks interfering for at least one power level, a fourth pair of different white space band channels and a second pair of different power levels;

add a fifth edge between a fifth pair of conflict nodes commonly associated with a third pair of different wireless networks, a first white space channel, and a third power level; and add a sixth edge between a sixth pair of conflict nodes commonly associated with a fourth pair of wireless networks, a second white space channel, and a third pair of different power levels.

\* \* \* \* \*